United States Patent [19]

McDole et al.

[11] Patent Number: 5,852,513
[45] Date of Patent: Dec. 22, 1998

[54] TELEVISION FILTER

[75] Inventors: James D. McDole, Rohnert Park; Donald L. Keehn, Healdsburg; John Morse Huish, Sebastapol; Orville Larry Creech, Jr., Santa Rosa, all of Calif.

[73] Assignee: Optical Coating Laboratory, Inc., Santa Rosa, Calif.

[21] Appl. No.: 856,132

[22] Filed: May 14, 1997

[51] Int. Cl.$^6$ .............................. H04N 5/72; G02B 1/11; G02B 5/28; G02B 7/00
[52] U.S. Cl. ..................... 359/580; 359/588; 359/888; 348/834; 348/835
[58] Field of Search ........................... 359/580, 588, 359/888, 892, 601; 348/834, 835

[56] References Cited

U.S. PATENT DOCUMENTS

| | | | |
|---|---|---|---|
| 2,478,385 | 8/1949 | Gaiser | 88/1 |
| 3,330,681 | 7/1967 | Scharf et al. | 117/33.3 |
| 3,356,522 | 12/1967 | Libbert | 117/33.3 |
| 3,463,574 | 8/1969 | Bastien et al. | 350/164 |
| 3,679,291 | 7/1972 | Apfel et al. | 350/164 |
| 3,781,090 | 12/1973 | Sumita | 360/164 |
| 4,196,246 | 4/1980 | Takayama et al. | 428/213 |
| 4,427,264 | 1/1984 | Kamerling | 350/276 |
| 4,639,069 | 1/1987 | Yatabe et al. | 350/1.7 |
| 4,659,178 | 4/1987 | Kyogoku | 350/166 |
| 4,725,109 | 2/1988 | Wank et al. | 350/1.6 |
| 4,747,674 | 5/1988 | Butterfield et al. | 361/220 |
| 4,784,467 | 11/1988 | Akatsuka | 350/166 |
| 4,798,994 | 1/1989 | Rijpers et al. | 313/478 |
| 4,846,551 | 7/1989 | Rancourt et al. | 350/166 |
| 4,851,095 | 7/1989 | Scobey et al. | 204/192.12 |
| 4,960,310 | 10/1990 | Cushing | 350/1.7 |
| 4,989,953 | 2/1991 | Kirschner | 350/311 |
| 5,004,320 | 4/1991 | Nagai et al. | 350/276 |
| 5,018,833 | 5/1991 | Bennett et al. | 350/314 |
| 5,153,481 | 10/1992 | Matsuda et al. | 313/479 |
| 5,155,627 | 10/1992 | Keehn et al. | 359/609 |
| 5,170,291 | 12/1992 | Szczyrbowski et al. | 359/580 |
| 5,172,269 | 12/1992 | Ogura et al. | 359/580 |
| 5,194,990 | 3/1993 | Boulos et al. | 359/587 |

(List continued on next page.)

FOREIGN PATENT DOCUMENTS

WO 96/13688   5/1996   WIPO .

OTHER PUBLICATIONS

Egerton, Clive; Beauchamp, Pat; Martin, Robert; and, Parish, Mark, "*Optical Filters for Displays*," Information Display, vol. 6, No. 11, pp. 6–9, Nov., 1990.

Primary Examiner—Jon Henry

[57] ABSTRACT

The present invention relates to an optical filter including a flexible, transparent substrate coated with a novel combination of optical coatings, and a frame system designed for mounting the optical filter to a television or other visual display screen. A neutral density contrast enhancement is included within the composition of a flexible substrate, or is coated on either the front, the rear, or both of the surfaces of the substrate. A silicone anti-glare hardcoat is applied to both the front and rear surfaces of the substrate. An anti-reflection coating is added to the front surface of the substrate, preferably via sputtering, and designed to reflect a specific color at a preferred brightness measurement. The combination of a front surface anti-reflection coating, front and rear surface anti-glare coatings, and a neutral density contrast enhancement, eliminates the need for an anti-reflection coating on the rear surface of the substrate. A two layer, non-conductive anti-reflection coating, which provides white or close to white reflected color and low reflectance, is preferred. The substrate is substantially flexible which allows the optical filter to be conformed to the major axis of curvature of the television cathode ray tube. The novel frame system permits the filter to be sized to fit many different television sizes or other visual display screens. The novel frame system also permits customized mounting of the optical filter in front of a television or other visual display screen. The frame system preferably includes two rails. The use of only two frame members further results in a pleasant, unobtrusive appearance of the frame system and optical filter.

42 Claims, 11 Drawing Sheets

U.S. PATENT DOCUMENTS

| | | | |
|---|---|---|---|
| 5,225,057 | 7/1993 | LeFebvre et al. | 204/192.13 |
| 5,227,916 | 7/1993 | Theirl et al. | 359/609 |
| 5,404,181 | 4/1995 | Hung | 348/786 |
| 5,407,733 | 4/1995 | Bjornard et al. | 428/216 |
| 5,444,329 | 8/1995 | Matsuda et al. | 313/479 |
| 5,450,238 | 9/1995 | Bjornard et al. | 359/580 |
| 5,494,743 | 2/1996 | Woodard et al. | 428/336 |
| 5,521,759 | 5/1996 | Debrowolsi et al. | 359/585 |
| 5,521,765 | 5/1996 | Wolfe | 359/885 |

TELEVISION FILTER

BACKGROUND OF THE INVENTION

1. The Field of the Invention

The present invention is directed generally to methods and apparatus for improving the optical performance of visual display screens. More specifically, the present invention is related to methods and apparatus for reducing glare and reflection and improving contrast in visual display screens.

2. The Relevant Technology

Glare from natural or artificial lighting is a recognized problem that degrades the image on televisions and other visual display screens. In addition, glare from natural and artificial lighting causes a reduction in the contrast of the television picture. As a result, portions of the television picture may be occluded or the quality of the picture may be diminished. Reflections from the television screen commonly interfere as well. In many instances the television cannot be positioned to reduce the unwanted reflections and glare.

A significant portion of television units currently in use or being sold do not have anti-glare and/or anti-reflection treatments. These televisions typically experience the aforementioned problems. The televisions that do provide some kind of anti-glare treatment insufficiently address the issues of reflection or contrast reduction that inevitably follow.

For example, anti-glare treatments such as etching and silica sprays have been utilized, but these reduce the contrast of the television picture by scattering light across the front surface of the television cathode ray tube. Further, these treatments cannot be applied by the consumer.

Anti-reflection coatings as applied to absorbing glass or plastic substrates for use as filters for personal computers typically cannot incorporate anti-glare coatings because those coatings degrade the resolution of the display.

Dark surround material and dark tint glass have been utilized in cathode ray tubes to provide improved contrast between the phosphors and the areas surrounding them. Yet these do not address the loss of contrast created by glare on the front surface of the cathode ray tube.

Furthermore, the contrast enhancement filters that are provided by some of the television manufacturers do not address the issues of anti-glare or anti-reflection. Instead, these filters add two mirror-like, or specularly reflective, surfaces. In addition, these filters are custom designed to fit only the manufacturer's televisions and do not offer flexibility to fit multiple televisions from multiple manufacturers.

In addition, it is not uncommon for conventional personal computer filters to be coated with conductive materials. However, the resulting conductivity necessitates methods for grounding the static electricity charges that may accumulate on the surface of the conductive filter.

SUMMARY AND OBJECTS OF THE INVENTION

It is therefore a primary object of the present invention to provide methods and apparatus for reducing the glare and improving the contrast of visual display screens, and especially television screens.

It is another object of the present invention to provide methods and apparatus for reducing the glare and improving the contrast of televisions which are easily utilized by the consumer.

It is another object of the present invention to provide anti-glare coatings which scatter incoming light that would otherwise result in specular reflections off the filter surfaces and the off the television cathode ray tube.

It is still another object of the present invention to provide coating materials that are non-conductive to eliminate the need to provide grounding for the static electricity charges that would accumulate on the surface of a plastic substrate coated with a conductive coating.

It is still another object of the present invention to provide methods and apparatus for protecting a television cathode ray tube from impact and damage.

Yet another object of the present invention is to provide a frame system designed such that a minimal number of product sizes accommodate the cabinet sizes of the televisions made by various manufacturers.

It is another object of the present invention to provide a frame system and flexible substrate designed to fit televisions with a cylindrically curved or a spherically curved cathode ray tube.

These and other objects and features of the present invention will become more fully apparent from the following description and appended claims, or may be learned by the practice of the invention as set forth hereinafter.

To achieve the foregoing objects, and in accordance with the invention as embodied and broadly described herein, the present invention relates to an optical filter including a flexible, transparent substrate coated with a novel combination of optical coatings, and a frame system designed for mounting the optical filter to a television or other visual display screen.

In a preferred embodiment of the present invention, a neutral density contrast enhancement is included within the composition of a flexible substrate, or is coated on either the front, the rear, or both of the surfaces of the substrate. A silicone anti-glare hardcoat is preferably applied to both the front and rear surfaces of the substrate. In a preferred embodiment an anti-reflection coating is added to the front surface of the substrate. The combination of the neutral density, two surface anti-glare and front surface anti-reflection has been found to eliminate the need for an anti-reflection coating on the rear surface of the substrate.

The anti-reflection coating is preferably designed to reflect a specific color at a preferred brightness measurement. A thin, two layer anti-reflection coating which provides white or close to white reflected color and low reflectance is preferred. One anti-reflection coating in accordance with the present invention comprises $TiO_2$ and $SiO_2$ in a two layer design. Alternatively, an anti-reflection coating according to the present invention may comprise $Nb_2O_5$ and $SiO_2$ in a two layer design.

The preferred anti-reflection coating of the present invention uses materials that are non-conductive. This eliminates the need to provide a method for grounding charges that accumulate on the surfaces of conventional plastic substrates coated with conductive coatings. In addition, the two layer anti-reflection coating is preferably applied to the substrate via sputtering, without decreasing the durability of the optical filter.

The substrate is substantially flexible which allows the optical filter to be conformed to the major axis of curvature of the television cathode ray tube; the filter curves in response to the extension of the cathode ray tube beyond the television cabinet. In addition, bending the filter to match the major axis of a television cabinet causes the filter to blend in with the look of the cabinet and allows the filter to closely contour the cathode ray tube.

The novel frame system permits customized mounting of the optical filter in front of a television or other visual display screen. In a preferred embodiment of the present invention, the frame system comprises two rails. The use of only two frame members further results in a pleasant, unobtrusive appearance of the frame system and optical filter.

BRIEF DESCRIPTION OF THE DRAWINGS

In order to more fully understand the manner in which the above-recited and other advantages and objects of the invention are obtained, a more particular description of the invention will be rendered by reference to a specific embodiment thereof which is illustrated in the appended drawings. Understanding that these drawings depict only a typical embodiment of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

Figure 1:
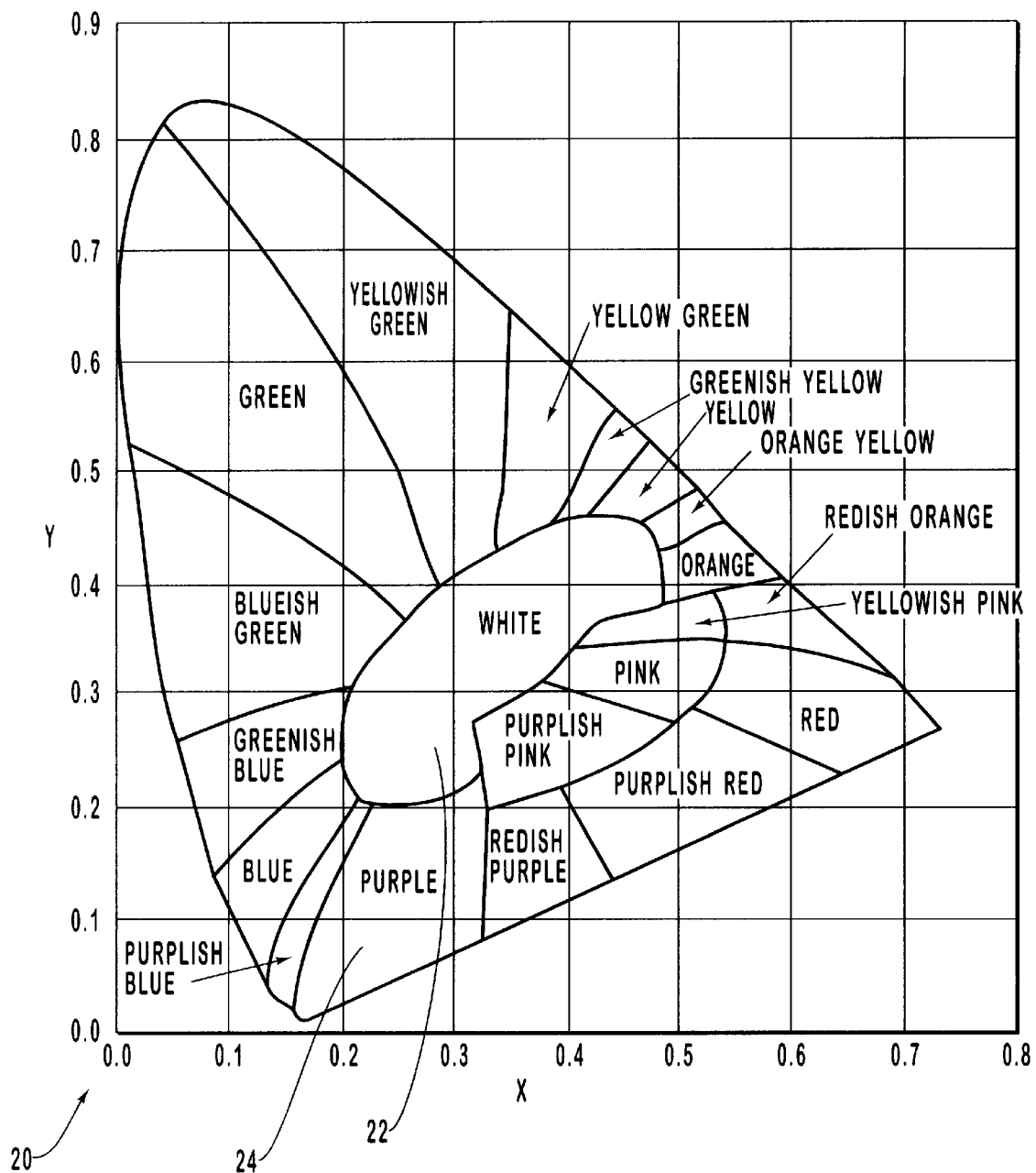
FIG. 1 is a standard chromaticity diagram.

Visual display devices, and especially direct television, suffer from unfortunate optical characteristics in certain environments such as glare, reflection, and contrast reduction. These optical characteristics often diminish the quality or brightness of the visual image, or even preclude the viewing of portions thereof. In an attempt to ameliorate the effects of these optical characteristics, various filters have been employed. However, none of the conventional filters have been designed specifically to address the anti-reflection, anti-glare, and contrast enhancement needs of televisions. The present invention is directed to methods and apparatus which provide the consumer with an easily mounted anti-glare, anti-reflection, and contrast improvement filter for televisions and other similar visual display screens.

The present invention preferably comprises an optical filter and a frame system. The frame system is a novel design for mounting the optical filter to a television or other visual display screen. The optical filter comprises a flexible, transparent substrate coated with a novel combination of optical coatings. These optical coatings preferably comprise a unique combination of anti-glare, anti-reflection, and contrast enhancement.

In a preferred embodiment of the present invention, a neutral density contrast enhancement is included within the composition of the substrate itself, or is coated on either the front, the rear, or both of the surfaces of the substrate. Alternatively, the neutral density contrast enhancement is included within the dispersed particles of the anti-glare coating to be described in more detail hereinbelow. Alternatively, the neutral density contrast enhancement is included as part of the anti-reflection coating to be described in more detail hereinbelow. Preferably, the neutral density contrast enhancement is a dark pigment within the flexible substrate, which absorbs light. The neutral density refers to the feature that the contrast enhancement affects the colors approximately equally across the visible spectrum. In addition, the contrast enhancement is used to enhance image contrast and reduce glare from a visual display screen.

The beneficial effects derived from the contrast enhancement of the present invention may be illustrated with respect to a television visual image. For example, in televisions, the "signal" is the television picture, and the "noise" is the ambient light, such as from windows and electric lights. If no contrast enhancement is in place, the signal is 100% and the noise is 100%. Thus the signal to noise ratio is 1:1. However, when a 50% transmission (T) contrast enhancement is added, the noise passes through the filter twice, thus it is reduced to 25%, (50%×50%) of its original strength. Yet the signal only passes through once, and is thus reduced to only 50% of its original strength. The resulting signal to noise ratio is now 2:1. It should be appreciated that this is a significant improvement in the signal to noise ratio when compared to the situation in which no contrast enhancement is in place.

The neutral density contrast enhancement of the present invention preferably has a transmission value from about 30% T to about 70% T. More preferably the transmission of the neutral density contrast enhancement from about 50% T to about 65% T.

The human eye is particularly sensitive to mirror-like, also known as specular, reflections. Many anti-glare coatings and treatments such as etching, embossing, or abrading, scatter unwanted light coming from natural and artificial lighting to decrease the specular reflections, yet generally these coatings or treatments are associated with an undesirable loss of resolution. One preferred embodiment of the present invention includes the use of a silicone anti-glare hardcoat containing small, well-dispersed silica particles which has the desirable effect of reducing specular reflections while avoiding the undesirable resolution loss conventionally experienced with other anti-glare coatings and treatments. The anti-glare coating of the present invention preferably produces a gloss measurement of about 45 to about 70 gloss units as read with a Gardner 60 degree gloss meter. In addition, the anti-glare coating of the present invention provides satisfactory resolution over of viewing angle from about 0 to about 70 degrees.

It should be appreciated that other anti-glare coatings, such as an acrylic hardcoat containing small, well dispersed silica particles, would be within the scope of the present invention. Furthermore, although silica is the inexpensive preference, it should be appreciated that other materials that reduce glare, while maintaining the preferred gloss measurements, would be within the scope of the present invention. For example, any transparent material with an index of refraction from about 1. To about 1.6 would provide the necessary characteristics. In addition, the neutral density contrast enhancement may be included within the dispersed particles of the anti-glare coating.

It has been discovered that by applying the preferred anti-glare coating of the present invention to both the front and rear surfaces of the substrate, the specular reflections are significantly reduced. Furthermore, it is a feature of the present invention that adding anti-glare coatings to both surfaces of the substrate, in combination with an appropriate level of neutral density contrast enhancement and an appropriate front surface anti-reflection coating, eliminates the need to for an anti-reflection coating on the rear surface of the substrate. In fact, applying anti-reflection coating to the rear surface of a substrate coated with the preferred combination of coatings of the present invention does not increase a user's perception of the optical performance significantly, yet it more than doubles the coating costs.

Table 1, for example, illustrates the slight variation between anti-reflective coatings on the front surface and anti-reflective coatings on both surfaces of a substrate, in combination with neutral density contrast enhancement, and coated on both surfaces with anti-glare coating. The Hunter reading is a measurement of reflection from both the front and rear surfaces of the substrate, while the Rapid Scan measures reflection from only the front surface. The Hunter reading depicts only a small difference between the reflection measurements for the anti-reflection coated substrates. As would be expected, the Rapid Scan measurements (front surface reflection only) are virtually identical for the anti-reflection coated substrates.

TABLE 1

| Substrate Sample | Hunter | Rapid Scan |
| --- | --- | --- |
| No anti-reflective coating | 6.48 | 5.10 |
| Front surface anti-reflective coating | 3.31 | 1.00 |
| Front and rear surface anti-reflective coating | 2.96 | 0.98 |

In order to achieve the desired optical characteristics for the optical filter of the present invention, the anti-reflection coating is preferably designed to reflect a specific color at a preferred photopic, also known as brightness, measurement. In addition, it is preferred that the reflected color fall within a color range that shall be referred to herein as a "white or close to white" area of a chromaticity diagram. Specifically, a CIE, or "Commission Internationale de l'Eclairage," chromaticity diagram quantifies the color of a light beam and gives the results in standard terms. FIG. 1 illustrates a typical CIE diagram designated generally by reference numeral 20.

The present invention envisions a reflected color near or within the substantially oval-shaped portion 22 of the diagram, which represents white reflected color. The phrase "white or close to white" will be used herein to refer to the white portion and immediate surrounding areas of a CIE diagram.

The perceived color of the light reflected or transmitted by an optical filter is often important. In television viewing, for example, the reflected color may interfere with the intended or actual colors of the television picture. For example in FIG. 1, a measurement of the reflection for a conventional anti-reflection coating is indicated by number 2 at the x,y coordinates (0.216, 0.075). This particular multi-layer anti-reflective coating results in reflected color in the purple section of the CIE diagram. Thus purple light is reflected back to the viewer from the surface of the anti-reflection coated optical filter.

Figure 9:
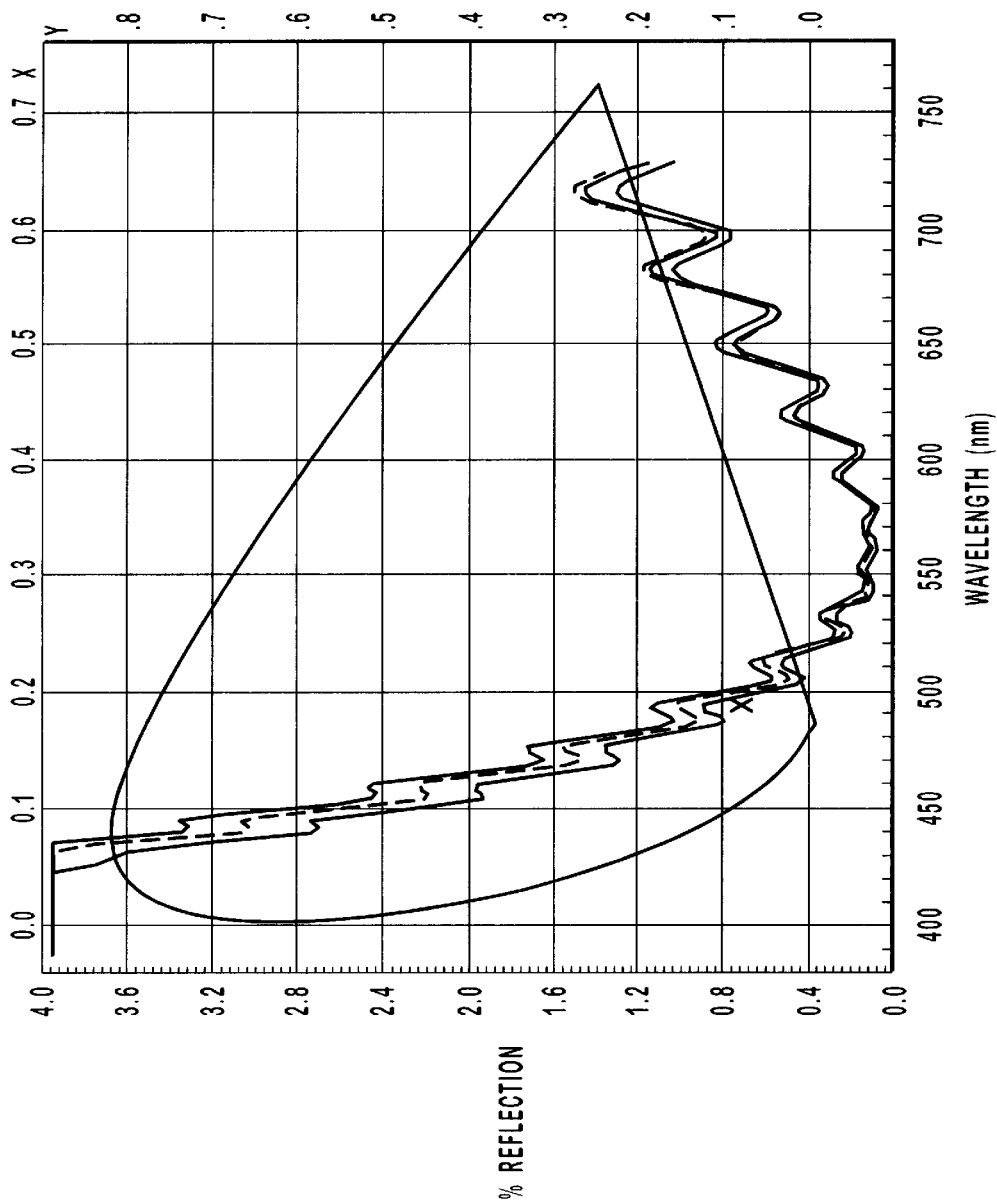
FIG. 9 is a graphical representation of optical characteristics for a V-coat in accordance with the prior art.

Conventional anti-reflection coatings include multi-layer anti-reflective coatings known as "V coats" because of the V-shaped curve that results when reflectance vs. wavelength is graphed. Typical V-coats comprise 2 layers. These V-coats typically have low or even no reflectance at a given wavelength in the visible region, but have narrow width and significant reflected color. For example, FIG. 9 illustrates a typical V-coat wherein the brightness is relatively low (0.35%), but the reflected color with the x,y coordinates, (0.1908, 0.0899) falls within the purple area of a CIE color diagram.

In response to the distinct reflected color of a typical V-coat, the conventional approach to achieve a broader bandwidth with low reflectance has been to add multiple layers of coating materials resulting in 3, 4, 5 or more layers of anti-reflection coatings. However, multiple coating layers typically involve evaporation and require high deposition temperatures to achieve durable coatings. Further, the materials utilized for evaporation are not particularly useful for sputter applications. In addition, the high coating temperatures are not conducive for coating plastic substrates such as polycarbonate and acrylic.

PCT Patent 96/13688, the entire disclosure of which is incorporated herein by reference, states that materials such as titanium dioxide, niobium pentoxide, or tantalum pentoxide impart so much heat to the substrate that they can only be used on high melting point substrates such as glass.

U.S. Pat. No. 5,407,733, the entire disclosure of which is herein incorporated by reference, discloses multiple coating layers designed to achieve low reflectance, but not directed to close to white reflected color.

In addition, in roll coating applications, special equipment such as chill drums may be utilized to coat thin, plastic substrates of about 0.001 to about 0.020 inches in thickness, but these methods are not useful with plastic substrates with thicknesses of about 0.060.

The present invention on the other hand preferably utilizes a two layer anti-reflection coating which provides a V-coat with white or close to white reflected color, and low reflectance. The two-layer coating comprises one layer with a low index of refraction and one layer with a high index of refraction. It has been discovered that when a V-coat in accordance with the present invention is specifically designed and controlled to fall within a white or close to white reflected color and to maintain no greater than a 1.3% photopic brightness measurement, in combination with an anti-glare front and rear surface hardcoat and a neutral density substrate, it is particularly useful in television applications to reduce glare and reflections, to enhance contrast, and to balance color and clarity.

Figure 2:
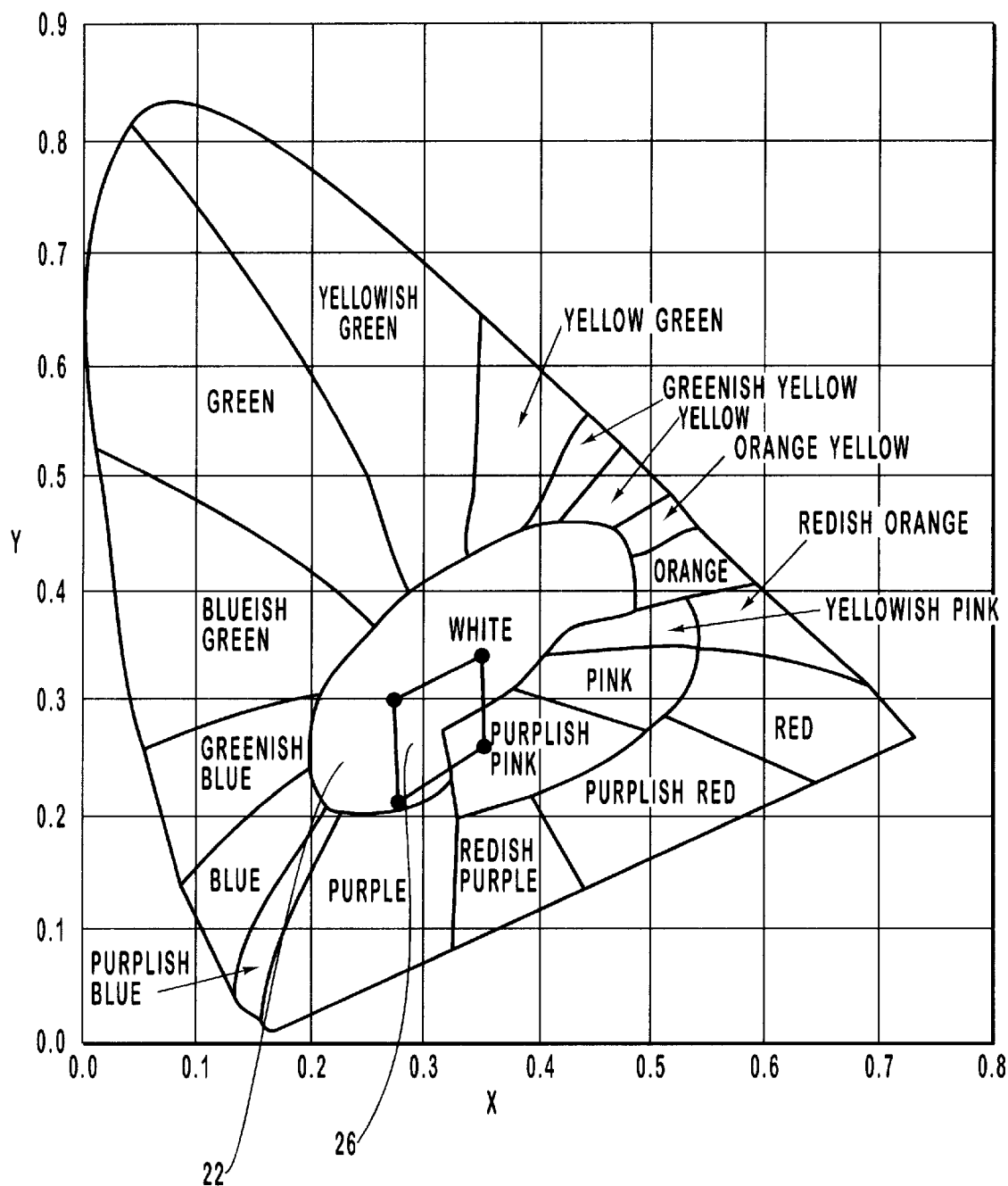
FIG. 2 is another standard chromaticity diagram.

In one presently preferred embodiment of the present invention, a two layer V-coat is designed to have a reflected color that is described by the (x,y) coordinates: (0.27, 0.21), (0.35, 0.26), (0.35, 0.35), and (0.27, 0.30). FIG. 2 illustrates the resulting color box 26 from these coordinates in the white or close to white area 22 of the CIE diagram.

Figure 3:
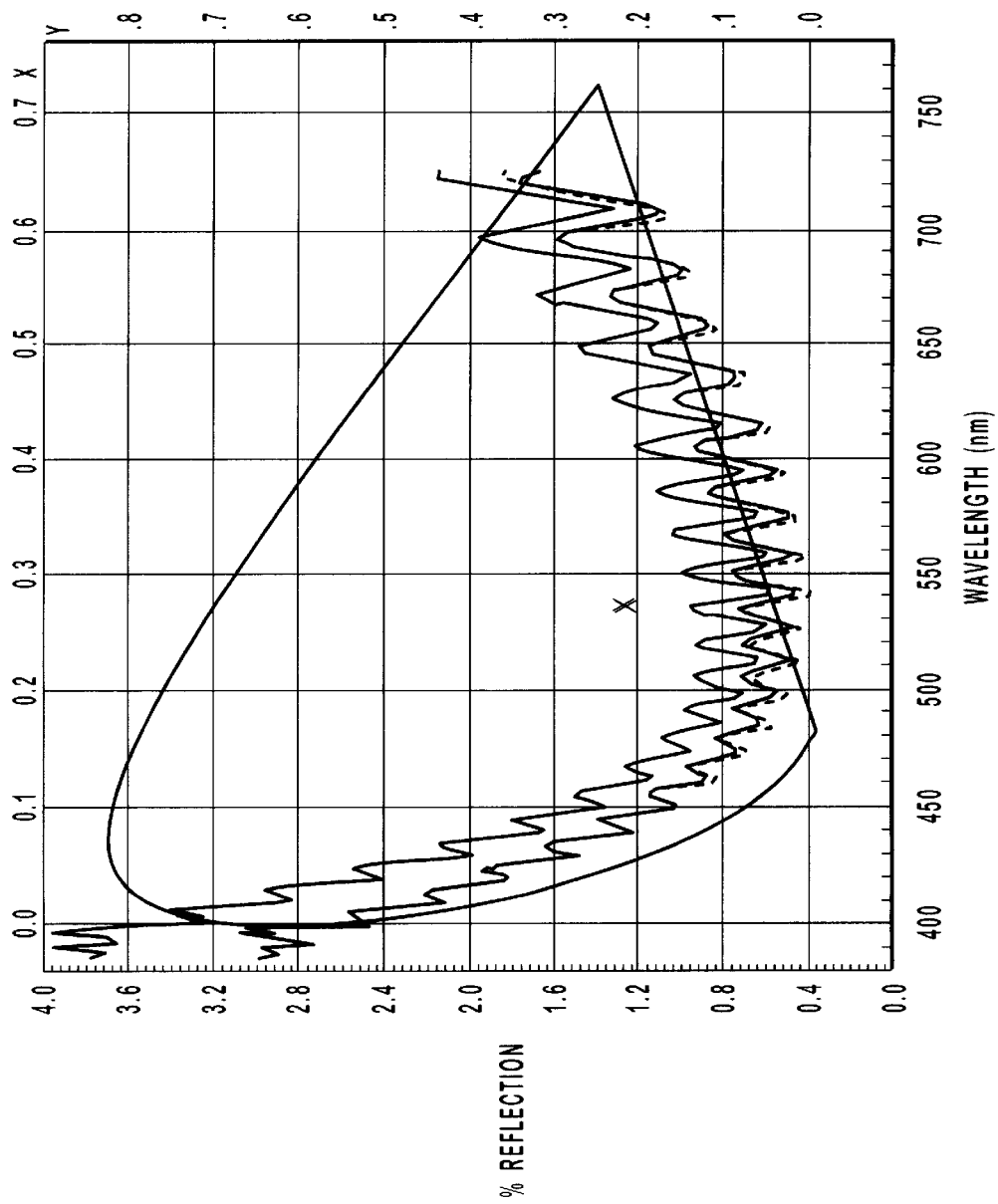
FIG. 3 is a graphical representation of optical characteristics for one embodiment of an optical filter in accordance with the present invention.
Figure 4:
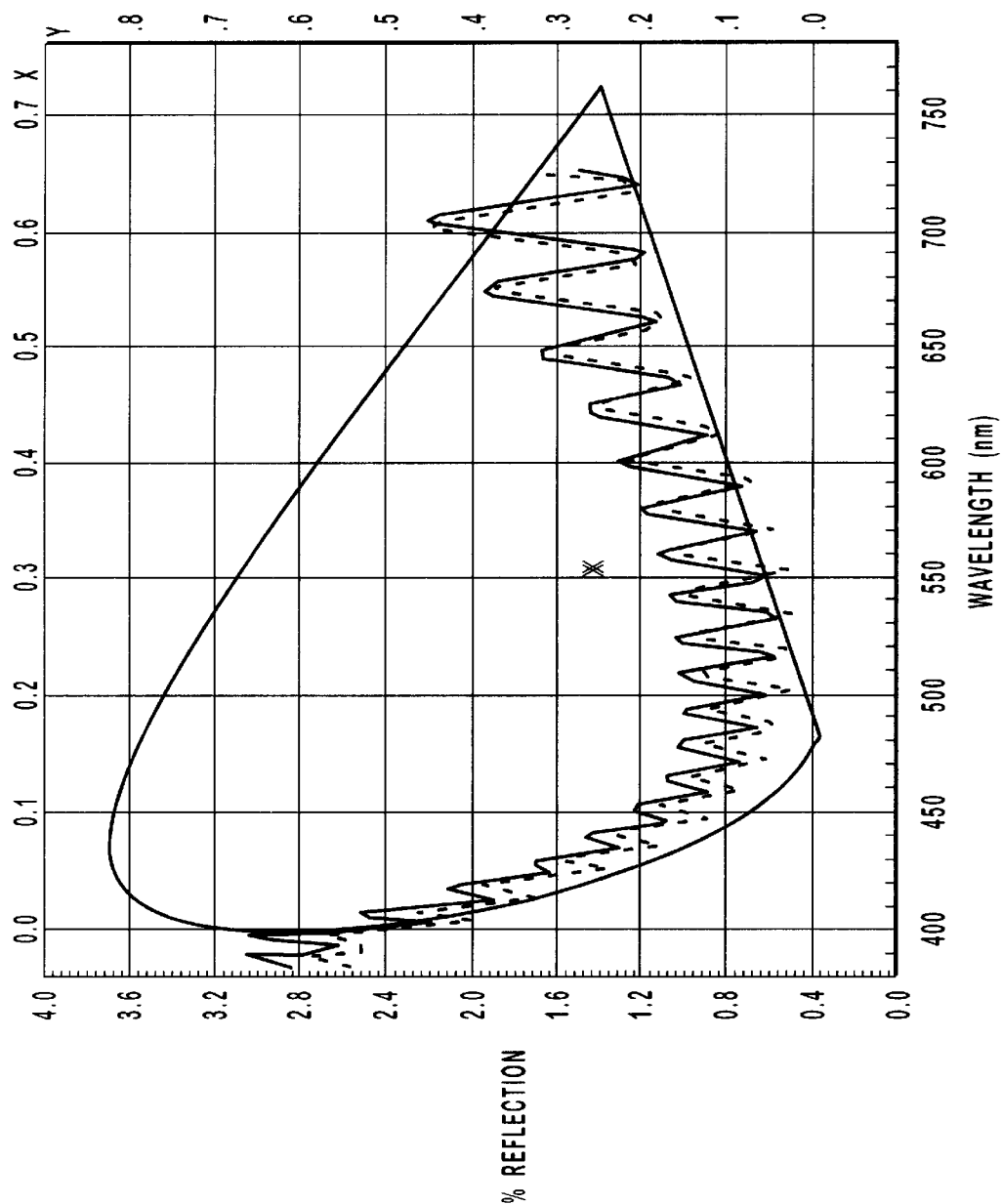
FIG. 4 is a graphical representation of optical characteristics for a alternate embodiment of an optical filter in accordance with the present invention.

A preferred V-coat according to the present invention comprises $TiO_2$ and $SiO_2$ in a two layer anti-reflection coating design. This two layer V-coat designed to provide a white or close to white reflected color comprises $TiO_2$ in a physical thickness from about 3.0 nm to about 7.0 nm, and $SiO_2$ in a physical thickness from about 120 nm to about 135 nm. FIG. 3 illustrates a graphical representation of the reflectance vs. wavelength for this anti-reflection coating when used with a neutral density substrate additionally coated with a hardcoat containing finely dispersed silica particles on the front and rear surface. The reflected color falls within the preferred white or close to white portion of a CIE diagram with the x,y coordinates, (0.2827, 0.2256). The photopic brightness is about 0.68%.

Alternatively, a V-coat according to the present invention may comprise $Nb_2O_5$ and $SiO_2$ in a two layer anti-reflection coating design. This two layer V-coat designed to provide a close to white reflected color comprises $Nb_2O_5$ in a physical thickness from about 3.0 nm to about 7.0 nm, and $SiO_2$ in a physical thickness from about 120 nm to about 135 nm. FIG. 5 illustrates a graphical representation of the reflectance vs. wavelength for this anti-reflection coating when used with a neutral density substrate additionally coated with a hardcoat containing finely dispersed silica particles on the front and rear surface. The reflected color falls within the preferred white or close to white range of a CIE diagram, with the x,y coordinates, (0.3169, 0.2638). The photopic brightness is about 0.86%.

Interestingly, the anti-reflection coating of the present invention preferably comprises a combination of materials believed to be ineffectual by the conventional wisdom. See, eg., PCT 96/13688. Furthermore, it should be appreciated by those of skill in the art that any other suitable material with a high index of refraction from approximately 1.8 to 2.5, such as, but not limited to, oxides of tantalum, hafnium, zirconium, tin, indium, zinc, and cerium, or nitrides of silicon, or mixtures of the foregoing materials, could be used in place of Ti or Nb. In addition, a material with a low index of refraction from about 1.38 to 1.52, such as, but not limited to, fluorine doped silicon oxide, hydrogen doped silicon oxide, carbon doped silicon oxide, or silica oxynitride controlled to a low index of refraction, could be used in place of the $SiO_2$. In addition, it should be appreciated by one of skill in the art that adhesion layers may be used on the substrate and in between optically active layers.

Figure 10:
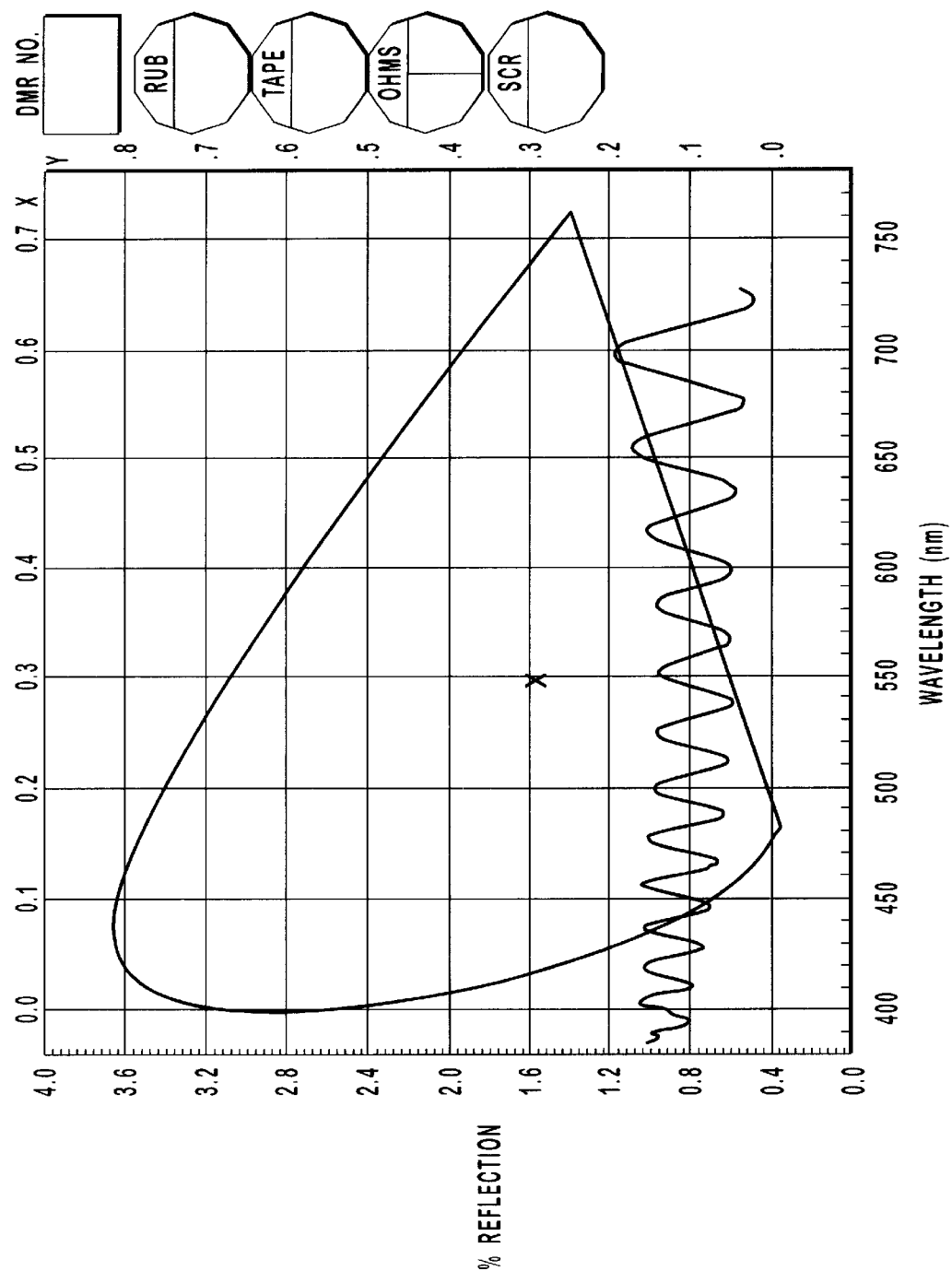
FIG. 10 is another graphical representation of optical characteristics for an optical filter in accordance with the present invention.
Figure 11:
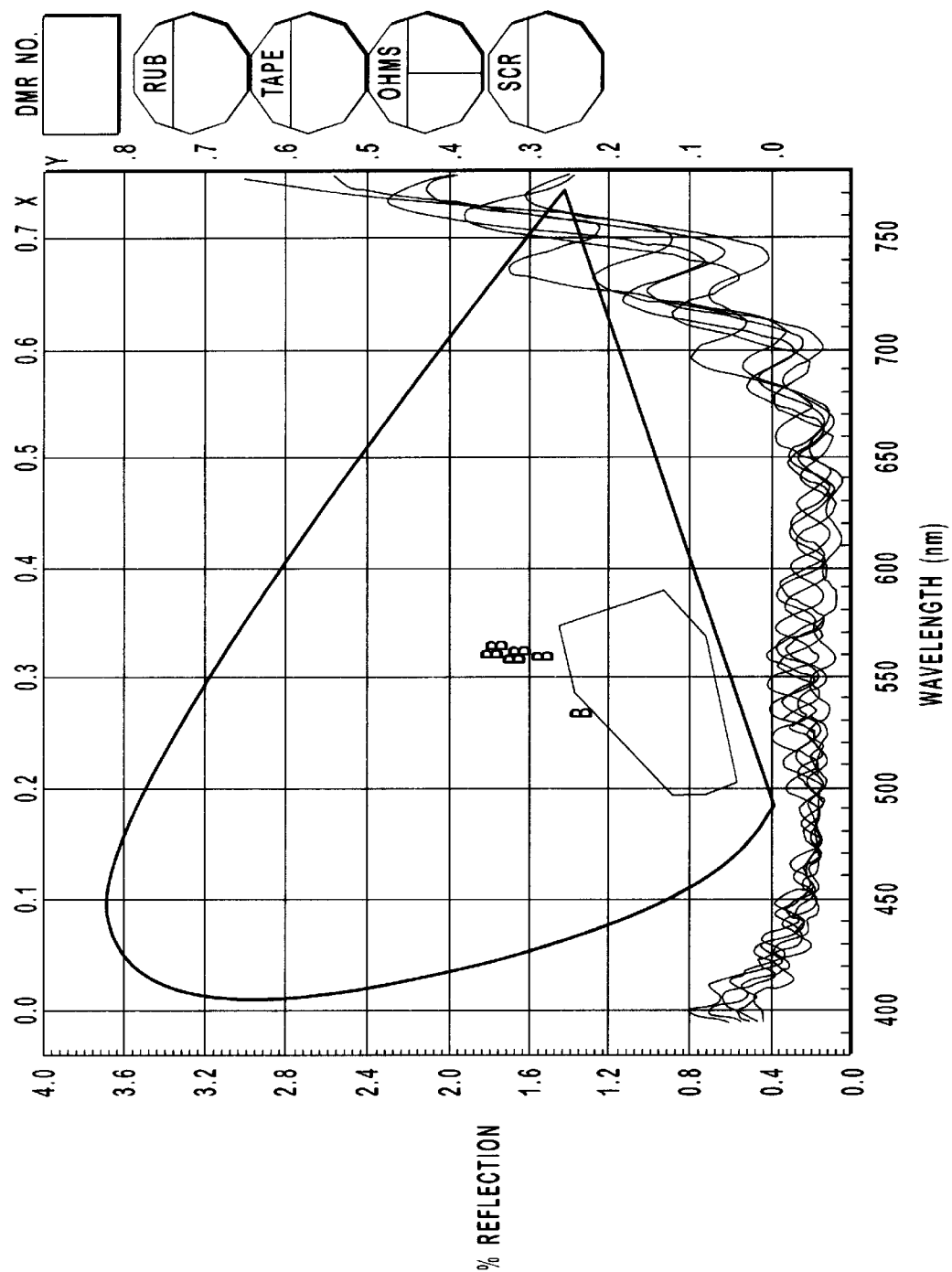
FIG. 11 is yet another graphical representation of optical characteristics for an optical filter in accordance with the present invention.

In addition, other anti-reflection coatings such as single layer $MgFl_2$ or $SiO_2$, or anti-reflection coatings of three or more layers could be designed to have the preferred white or close to white reflected color, and thus would fall within the scope of the present invention. For example, FIG. 10 illustrates a graphical representation of the reflectance vs. wavelength for a single layer $MgFl_2$ anti-reflection coating when used with a neutral density substrate additionally coated with a hardcoat containing finely dispersed silica particles on the front and rear surface. FIG. 11 illustrates a graphical representation of the reflectance vs. wavelength for a four layer anti-reflection coating when used with a neutral density substrate additionally coated with a hardcoat containing finely dispersed silica particles on the front and rear surface.

Further, the preferred anti-reflection coating of the present invention uses materials that are non-conductive. This eliminates the need to provide a method for grounding charges that accumulate on the surfaces of conventional plastic substrates coated with conductive coatings. For example, the coatings taught in U.S. Pat. No. 5,407,733 result in conductive coatings that must be grounded to remove static electricity charges that accumulate on the conductive coated substrate.

Conventionally, in the coating of plastic substrates by sputtering, the materials and the cathode powers used, the number of layers of coating, the speed of coating, the thermal absorption of the substrate, and the thermal absorption and reflectivity of objects in the coating chamber such as conveyor belts, carrier, shields, coating chamber walls, and coating residues have an effect on the temperature rise of the plastic substrate. In many cases the coating of plastic substrates by sputtering has resulted in temperature increases detrimental to the substrate stability or in coating stresses that decrease the durability of coatings.

However, the use of coatings with fewer layers helps alleviate problems associated with high substrate temperatures. In a preferred embodiment of the present invention, the two layer anti-reflection V-coat is preferably applied to the substrate via sputtering, without detrimental effect on the plastic substrate. In addition, the use of coating designs with fewer layers allows for faster coating speeds, lower costs, and redundancy in coating machines with sufficient cathode locations to have spare cathodes that can be brought into service when necessary without venting the machine. Further, coatings with fewer layers are generally easier to control than coatings with more layers and do not require as much isolation of coating zones as is required by coatings with more layers.

Alternatively, the anti-reflection coating of the present invention may be applied with use of technology such as disclosed in U.S. Pat. No. 4,851,095 and U.S. Pat. No. 5,225,057, the entire disclosures of which are herein incorporated by reference.

Figure 8:
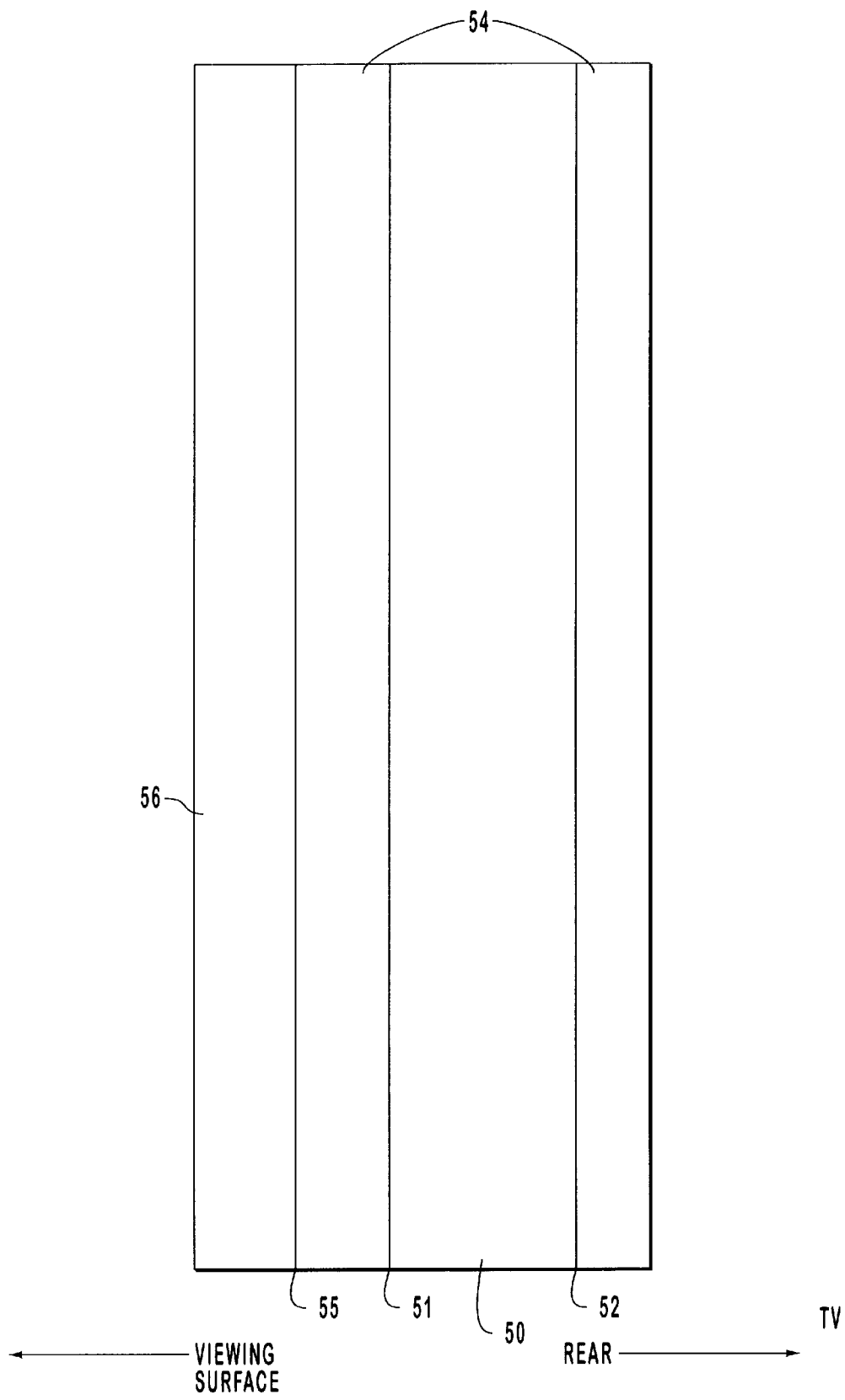
FIG. 8 is a cross sectional view of a preferred embodiment of an optical filter in accordance with the present invention.

The preferred substrate of the present invention is from about 0.057 to about 0.060 inches in thickness, although it should be appreciated that greater or lesser substrate thicknesses would be within the scope of the present invention. FIG. 8 illustrates a cross sectional view of a preferred embodiment of a substrate in accordance with the present invention and the novel combination of coatings applied thereto. The substrate 50 includes neutral density contrast enhancement and is coated on both its front viewing surface 51 and the rear surface 52 with an anti-glare hardcoat 54. An anti-reflection coating 56 in accordance with the present invention is then added to the front portion 55 only, and not the rear portion. As previously described hereinabove, the anti-reflection coating 56 preferably comprises two layers, yet may alternatively comprise one, three, four, five, or more layers.

Figure 5A:
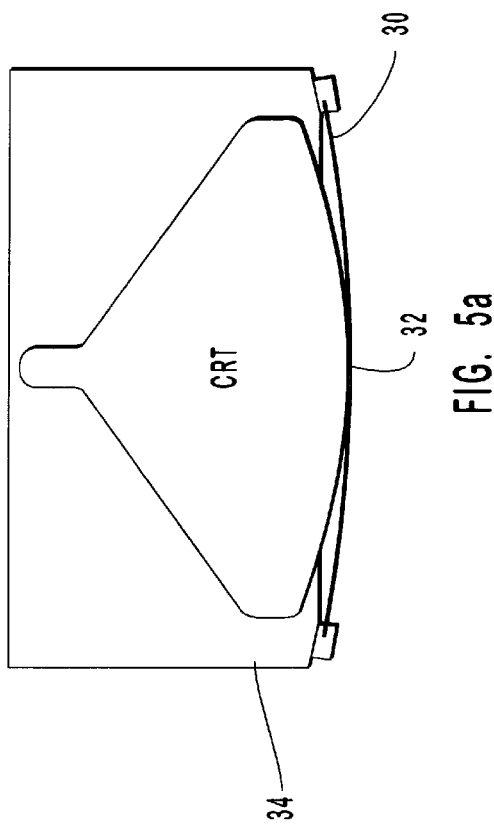
FIG. 5(a) is a top, cross sectional view of one embodiment of a filter and frame system in accordance the present invention.
Figure 5C:
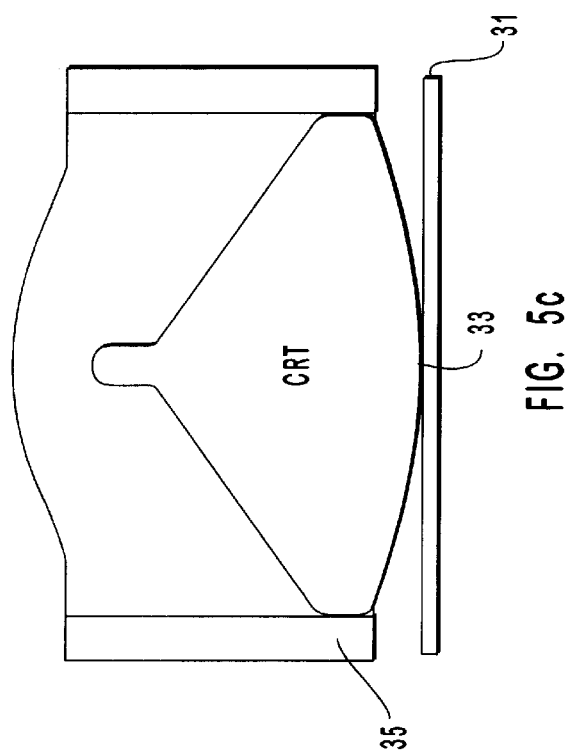
FIG. 5(c) is a top, cross sectional view of one embodiment of a conventional filter.
Figure 5B:
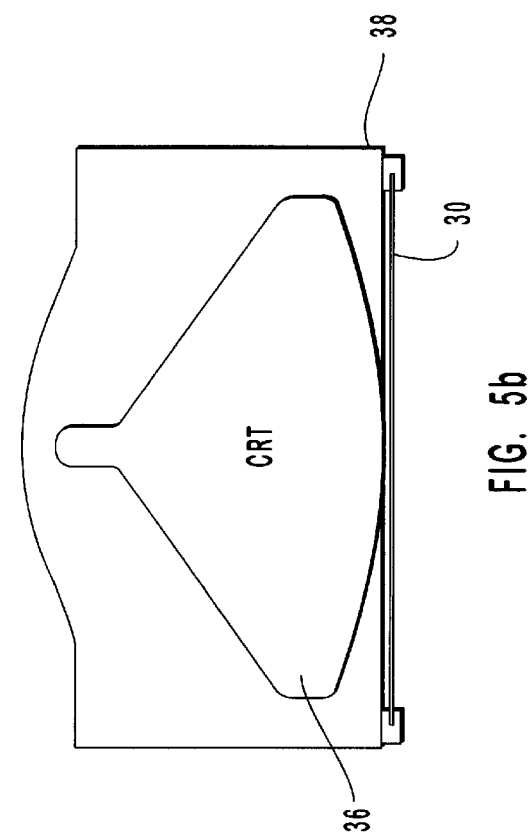
FIG. 5(b) is an alternate top, cross sectional view of the embodiment of the filter and frame system from FIG. 5(a).

One preferred material for the substrate is polycarbonate, a flexible and transparent material. The flexibility of the substrate allows the optical filter 30 to be conformed to the major axis of curvature of the television cathode ray tube 32, as illustrated in FIG. 5(a), wherein it is illustrated that the filter 30 curves in response to the extension of the cathode ray tube 32 beyond the television cabinet 34. FIG. 5(b) illustrates that the optical filter 30 of the present invention may also remain flat so as to conform to a television wherein the cathode ray tube 36 does not extend beyond the television cabinet 38. In contrast, FIG. 5(c) illustrates an example of a conventional filter 31 which does not conform to the curvature of the cathode ray tube 33. Thus the conventional filter 31 extends obtrusively from the television cabinet 35.

The fact that the television filter of the present invention can remain flat or can be bent to a generally cylindrical shape when it is attached to a television cabinet provides the advantage that reflections from sources above or below the television are reduced compared to a spherical cathode ray tube surface. In addition, bending the filter to match the major axis of a television cabinet causes the filter to blend in with the look of the cabinet and allows the filter to closely contour the cathode ray tube.

In addition, the customized positioning of the flexible optical filter and the cathode ray tube offers the beneficial advantage that the anti-glare surface is close to the surface of the television. This further reduces the amount of resolution loss typically experienced with conventional anti-glare coatings as described hereinabove.

Figure 6A:
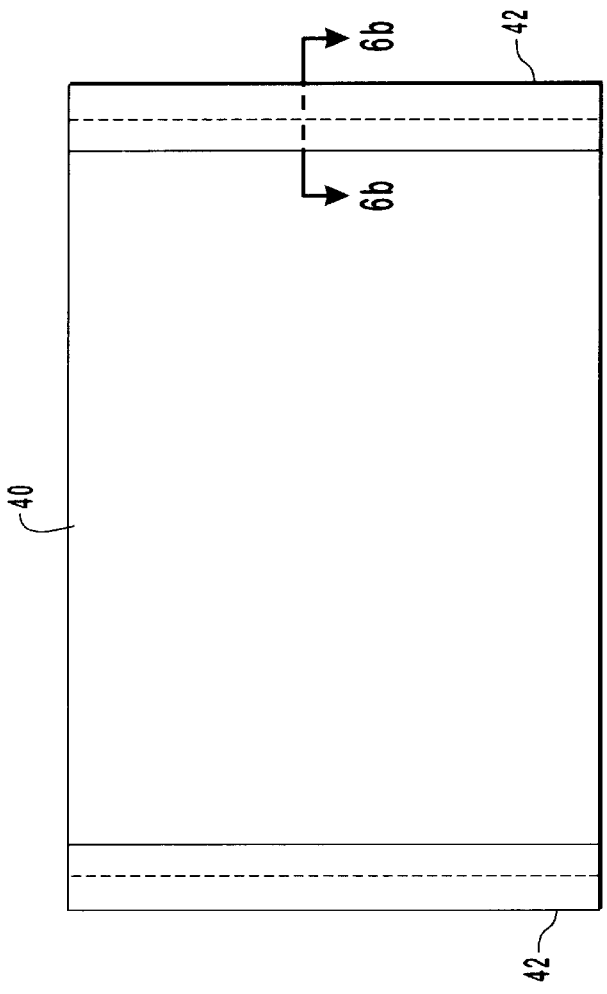
FIG. 6(a) is a front view of one embodiment of an optical filter and frame system in accordance with the present invention.

It is an additional feature of the present invention that a novel frame system permits customized mounting of the optical filter in front of a television or other visual display screen. In a preferred embodiment of the present invention, the frame system comprises two rails. FIG. 6(a) illustrates a front view of frame system in accordance with the present invention with frame members on either side of an optical filter.

Figure 6B:
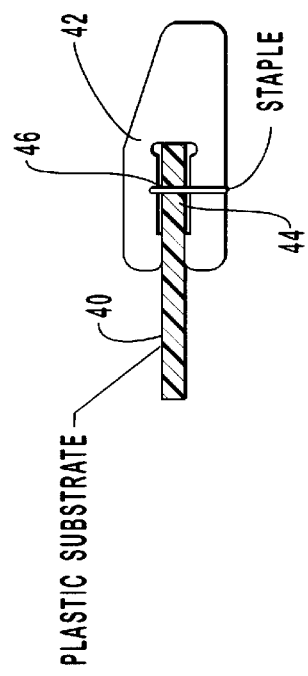
FIG. 6(b) is a partial side, cross sectional view of the optical filter and frame system from FIG. 6(a)

The frame members preferably attach to the optical filter via the use of staples. FIG. 6(b) illustrates a side view of a portion of an optical filter 40 retained within a channel 44 of a frame member 42 and further secured with a staple 46. It should be appreciated, however, that the optical filter may be retained within or attached to the frame member with the use of friction, adhesives, snaps, welds or other attachment mechanisms.

It is an additional feature of the present invention that the frame members can be produced inexpensively and quickly. By way of example only, and not limitation, the frame members may be fabricated by extruding, thermoforming, injection molding, pressure forming, vacuum forming, compression molding, or by metal fabrication. In contrast, prior art frames, such as those for personal computer monitors, typically cannot be made by the extrusion methods and require more expensive injection or thermoform molds.

It is preferred that the frame members be fabricated by extrusion. This allows the frame members to be cut to appropriate lengths as needed to accommodate various different sizes of television screens. In turn, the amount of inventory may be reduced accordingly. In contrast, prior art frames, such as those used for personal computer monitors and made by the more expensive injection and thermoform molds, cannot be easily adjusted in size.

Figure 7A:
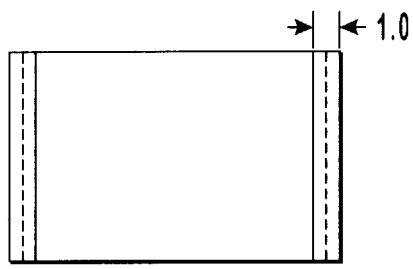
FIG. 7 is a front view of three alternate embodiments of frame systems and optical filters in accordance with the present invention.
Figure 7B:
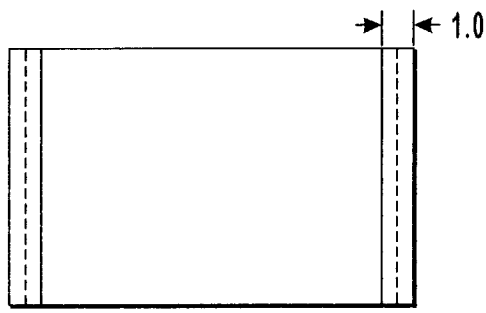
Figure 7C:
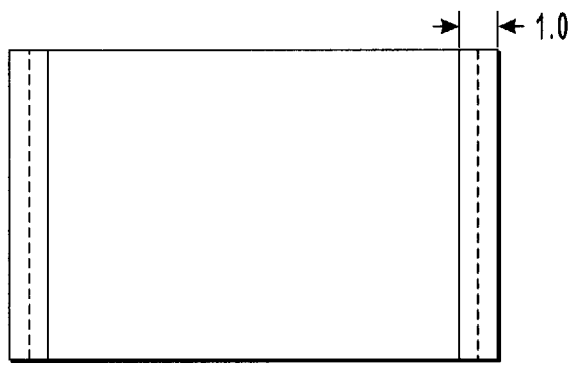

It is yet another feature of the present invention that the frame members as well as the optical filters are fabricated in a variety of sizes at the time of manufacture to fit multiple television sizes. FIG. 7, for example, illustrates three differently sized frame system and optical filter combinations for three different televisions.

In addition, the use of only two frame members further results in a pleasant, unobtrusive appearance of the frame system and optical filter. It is preferred that the frame members attach to the short sides of a rectangular optical filter. This minimizes the length of the frame members as well as any interference with the available viewing area of the television. Further, the use of only two frame members facilitates the curvature feature of the optical filter such that the optical filter may bend to conform to the shape of the television cabinet or to the shape of a television cabinet and to a protruding cathode ray tube. This also reduces obtrusiveness in helping the optical filter to blend with the curvature of the television cabinet.

It should be appreciated that the present invention is in no way limited to applications for television screens. To the contrary, the present invention is directed to optical filters and frame systems for use other visual display screens such as those utilized in medical applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An optical filter assembly for use with televisions, said assembly comprising:
   a. an optical filter having optical properties suitable for mounting in front of a television screen, said optical properties including neutral density contrast enhancement,
      said optical filter comprising a substrate having a front viewing surface and a rear surface,
         said front and rear surfaces comprising an anti-glare coating, and
         said front viewing surface having an anti-reflection coating providing a photopic brightness measurement of no greater than 1.3%,
            the anti-reflection coating providing white or close to white reflected color and white or close to white transmitted color; and
   b. a frame system for mounting said optical filter in front of a television screen while minimizing interference with the available viewing area of said screen,
      said frame system comprising two frame members, and
      said frame system comprising means for securing frame members to the television screen.

2. An apparatus as recited in claim 1, wherein said anti-reflection coating comprises one layer.

3. An apparatus as recited in claim 1, wherein said anti-reflection coating comprises two layers.

4. An apparatus as recited in claim 1, wherein said anti-reflection coating comprises three layers.

5. An apparatus as recited in claim 1, wherein said anti-reflection coating comprises four layers.

6. An apparatus as recited in claim 1, wherein said anti-reflection coating comprises five layers.

7. An apparatus as recited in claim 1, wherein said anti-reflection coating comprises a plurality of layers.

8. An apparatus as recited in claim 1, wherein said anti-reflection coating comprises $TiO_2$ in a physical thickness no greater than about 7.0 nm.

9. An apparatus as recited in claim 1, wherein said anti-reflection coating comprises $Nb_2O_5$ in a physical thickness no greater than about 7.0 nm.

10. An apparatus as recited in claim 1, wherein said anti-reflection coating comprises $SiO_2$ in a physical thickness no greater than about 135 nm.

11. An apparatus as recited in claim 1, wherein said anti-reflection coating is non-conductive.

12. An apparatus as recited in claim 1, wherein said anti-reflection coating is applied to said substrate by sputtering.

13. An apparatus as recited in claim 1, wherein said white or close to white reflected color falls into a CIE color coordinate diagram described by the (x,y) coordinates: (0.27, 0.21), (0.35, 0.26), (0.35, 0.35), and (0.27, 0.30).

14. An apparatus as recited in claim 1, wherein said white or close to white reflected color falls into a CIE color coordinate diagram described by the white area of said CIE color coordinate diagram.

15. An apparatus as recited in claim 1, wherein said anti-glare coating produces a gloss measurement of about 45 to about 70 gloss units as read with a Gardner 60 degree gloss meter.

16. An apparatus as recited in claim 1, wherein said anti-glare coating produces a gloss measurement of about 50 to about 65 gloss units as read with a Gardner 60 degree gloss meter.

17. An apparatus as recited in claim 1, wherein said neutral density contrast enhancement provides transmission from about 30% T to about 70% T.

18. An apparatus as recited in claim 1, wherein said neutral density contrast enhancement provides transmission from about 50% T to about 65% T.

19. An apparatus as recited in claim 1, wherein said neutral density contrast enhancement is coated on at least one surface of the substrate.

20. An apparatus as recited in claim 1, wherein said neutral density contrast enhancement is included within the substrate.

21. An apparatus as recited in claim 1, wherein said neutral density contrast enhancement is included within the anti-glare coating.

22. An apparatus as recited in claim 1, wherein said neutral density contrast enhancement is included within the anti-reflection coating.

23. An apparatus as recited in claim 1, wherein said optical filter comprises a plastic substrate.

24. An apparatus as recited in claim 1, wherein said optical filter comprises a flexible substrate.

25. An apparatus as recited in claim 24, wherein said frame members permit the optical filter to bend to approximate a single plane of a curved surface of a television screen.

26. An apparatus as recited in claim 1, wherein said frame members are fabricated by extruding.

27. An apparatus as recited in claim 1, wherein said frame members are fabricated by injection molding.

28. An apparatus as recited in claim 1, wherein said frame members are fabricated by pressure forming.

29. An apparatus as recited in claim 1, wherein said frame members are fabricated by vacuum forming.

30. An apparatus as recited in claim 1, wherein said frame members are fabricated by metal fabrication.

31. An apparatus as recited in claim 1, wherein said frame members are fabricated by thermoforming.

32. An apparatus as recited in claim 1, wherein said frame members are fabricated by compression molding.

33. An optical filter assembly for use with visual display screens, said assembly comprising:

a. an optical filter having optical properties suitable for mounting in front of a visual display screen, said optical properties including neutral density contrast enhancement, said optical filter comprising a flexible substrate having a front viewing surface and a rear surface, said front and rear surfaces comprising an anti-glare coating, and said front viewing surface having an anti-reflection coating providing a photopic brightness measurement of no greater than 1.3%, the anti-reflection coating providing white or close to white reflected color and white or close to white transmitted color; and b. a frame system comprising two frame members permitting said optical filter to bend to approximate a single plane of a curved surface of a visual display screen.

34. An apparatus as recited in claim 33 wherein said two frame members are further configured for mounting said optical filter in front of a visual display screen while minimizing interference with the available viewing area of said screen.

35. An apparatus as recited in claim 34, wherein said frame system comprises means for securing frame members to the visual display screen.

36. An apparatus as recited in claim 34, wherein said frame members are fabricated by extruding.

37. An apparatus as recited in claim 34, wherein said frame members are fabricated by injection molding.

38. An apparatus as recited in claim 34, wherein said frame members are fabricated by pressure forming.

39. An apparatus as recited in claim 34, wherein said frame members are fabricated by vacuum forming.

40. An apparatus as recited in claim 34, wherein said frame members are fabricated by metal fabrication.

41. An apparatus as recited in claim 34, wherein said frame members are fabricated by thermoforming.

42. An apparatus as recited in claim 34, wherein said frame members are fabricated by compression molding.

\* \* \* \* \*